H. B. SEELY.
COOKER.
APPLICATION FILED JULY 17, 1911.
1,046,870. Patented Dec. 10, 1912.
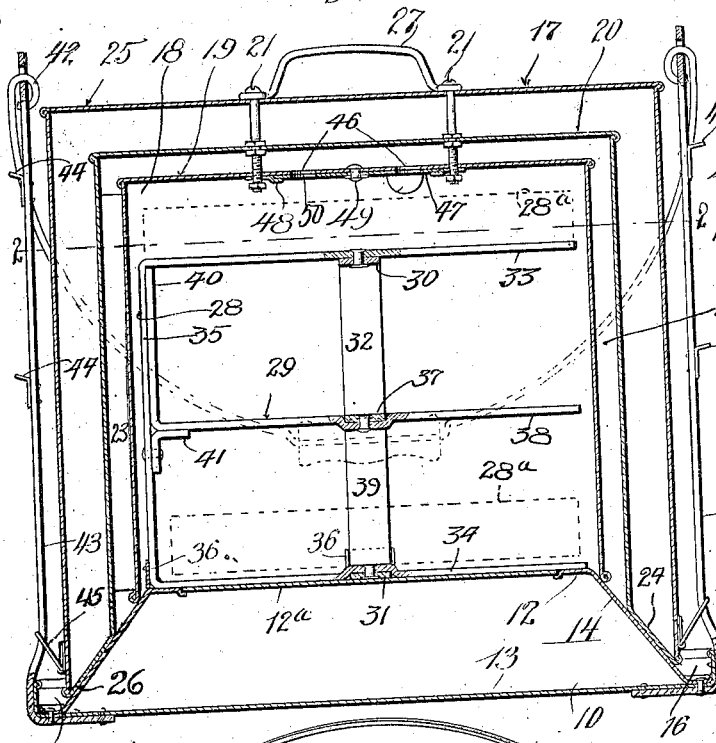
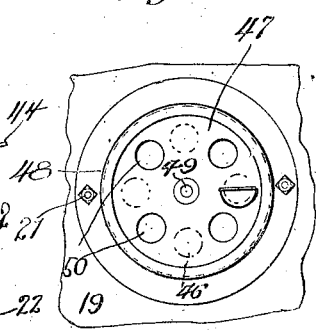
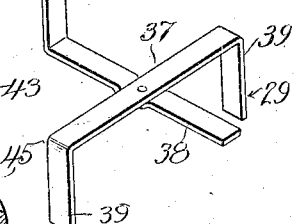
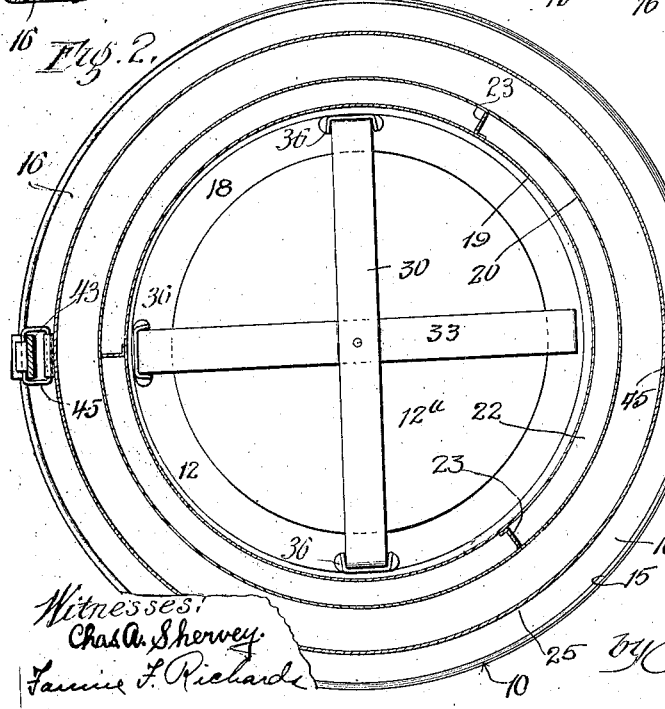
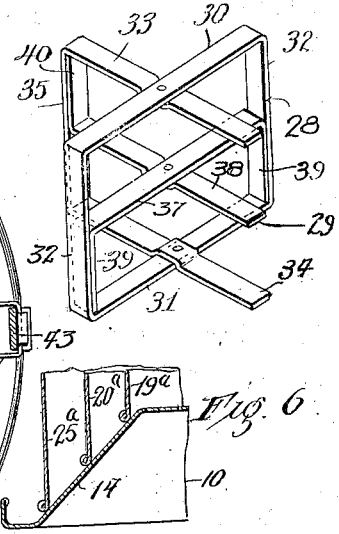

UNITED STATES PATENT OFFICE.

HERMAN B. SEELY, OF CHICAGO, ILLINOIS.

COOKER.

1,046,870.     Specification of Letters Patent.     Patented Dec. 10, 1912.

Application filed July 17, 1911. Serial No. 638,850.

*To all whom it may concern:*

Be it known that I, HERMAN B. SEELY, a citizen of the United States, residing at Chicago, in the county of Cook and State of Illinois, have invented new and useful Improvements in Cookers, of which the following is a specification.

This invention relates to cookers, the object being to provide a utensil of improved construction wherein foods may be cooked or baked as the case may be, either with or without the use of external heat.

To such ends, this invention consists in certain novel features of construction and arrangement, a description of which will be found in the following specification, and the essential features of which will be more particularly pointed out in the appended claims.

The invention is clearly illustrated in the drawings furnished herewith, in which—

Figure 1, is a central, vertical section through a cooker and baker embodying my invention, Fig. 2 is a horizontal section taken on the line 2—2 of Fig. 1, Fig. 3 is an underplan view of a fragment of the cover, Fig. 4 is a perspective view of a section of an auxiliary rack, Fig. 5 is a perspective view of the complete rack, and Fig. 6 is a fragmental, vertical section of a modified form of the device.

In these views 10, is a hollow base which may be filled with some heat insulating substance, or may receive some form of heat producer, as for instance an electric heating apparatus, and as shown, said base has top and bottom portions 12, 13, that are joined by an inclined annular wall 14. The top is preferably formed with an opening through which the heat producing apparatus may be inserted, and said opening is closed by a cover 12ª. The bottom 13 of the base is preferably turned up at its outer peripheral edge to form an upwardly extending flange 15, whereby an annular trough 16, is provided around the lower edge of the annular wall 14.

A cover or closure 17, is supported by the base and preferably rests upon the inclined annular wall 14. Said cover contains a chamber 18, in which the food commodities are contained during the process of cooking or baking. In forming the cover 17, an inner downwardly opening bell 19, is employed, which bell is carried by a second bell 20, that surrounds the top and sides of the bell 19. Any suitable means, here shown as bolts and nuts 21, may be employed for connecting the two. The inner bell is free to move upon its support, and is adapted to seat itself upon the base, independent of the other bell. The inner bell 19, is spaced away from the bell 20, to provide a steam chamber 22, and as shown, webs 23, are provided upon the wall of the bell 19, to space the two apart. The lower edge of the bell 20, flares outwardly to form a neck 24, that practically fits upon the inclined wall 14, of the base.

The bells 19, 20, and chamber 22, form a heat insulating jacket which surrounds the chamber 18, and this particular arrangement may be found sufficient to prevent the heat from readily escaping from the chamber 18. It may be found desirable however, to employ a second heat insulating jacket surrounding the first jacket, and I have shown a third bell 25, spaced away from the bell 20, and secured thereto at its lower edge, as shown at 26, to form a sealed chamber adapted to receive some form of heat insulating material. The bolts 21, extend through the top members of the three bells and space them apart, and a handle 27, is preferably secured to said bolts as shown in Fig. 1.

When the device is used for baking foods, an electric heater, hot soap-stones or other hot plates, are placed within the chamber 18, and the food is placed over said electric heater, or above or between the soap-stones. In place of the internally applied heat, the heater in the base may be used to heat the chamber, or the closure may be placed over any suitable heat generating device.

I have designed a rack for supporting and spacing apart the food and soap-stones. As shown, the rack is preferably made from strap iron and comprises the main rack 28, and the auxiliary rack 29. The main rack has horizontal top and bottom bars 30, 31, which are connected by side bars 32, forming a rectangular frame. Extending at right angles thereto is the other member of the rack which has top and bottom pieces 33, 34, and an end bar 35. The top bars and the bottom bars of the two members of the rack are preferably riveted or otherwise secured together, so as to make a perfectly rigid structure. It will be noticed that one side of this rack is unprovided with any end member whereby the rack is left with an open side through which the food or soap-stones may be introduced. The rack may be rigidly secured in place upon the base or may be removed. I have shown sockets 36, that are secured to the base 10, in which the rack may be placed and said sockets are adapted to position and hold the rack in place upon the base. The main rack 28, is used where the object to be baked requires considerable space, but when it is desired to bake a plurality of thinner food stuffs, the supplemental rack 29, is placed in the main rack, thereby dividing it into two separate tiers. Said supplemental rack has two cross-bars 37, 38, that are secured together at their points of intersection, and the cross-bar 37, has two downwardly extending side members 39, while the cross-bar 38, has an upwardly extending end member 40. The auxiliary rack is placed within the main rack with the end pieces 39, resting upon the bottom member 31, of the main rack, and the end member 40, secured between the top bar 33, and a bracket 41, secured to the end member 35, of the main rack. In using the rack as a whole, soap-stones may be placed upon one or all of the horizontal members of the rack and foods may be set upon the lower and intermediate soap-stones.

I have shown a bail 42, for carrying the device about, and said bail is secured to two upright posts 43, that are secured to the base 10, in any suitable manner. Said posts have a number of shoulders or projections 44, extending out therefrom that are adapted to support the cover at various heights, through the instrumentality of loops 45, which are secured to the cover and adapted to be hooked over the shoulders or projections 44. This provides simple means for supporting the cover at various heights, so that when the cover is hung upon said shoulders, the food stuffs may be exposed to view and examined by the attendant.

In using the device as a baker, the heat apparatus may be turned on, or the hot soap-stones and the food stuffs may be placed upon the rack and the cover set down upon the base. I have provided perforations 46, in the top of the inner bell 19, for the escape of steam which arises from the food stuffs that are being baked. Said steam fills the space between the bells 19, 20, and creates a steam jacket around the food chamber 18. As the steam condenses it runs down the wall of the bell 20, down the inclined wall 14, of the base and into the trough 16.

When the device is used for cooking foods the rack may be dispensed with if desired, and the vessel, which contains the food to be cooked, may be placed directly upon the base 10, and the cover set down over the same. In this case it may be desirable to close the openings 46, and for this reason I have provided a plate 47, which is secured upon the top member of the bell 19, as by means of a ring 48, in which it turns. If desired, the plate may be pivoted to the top by a rivet or other device 49. Said plate 47, contains holes 50, that register with the holes 46, in the bell, and by properly turning the plate 47, said holes may be brought in register with the holes in the bell, thereby allowing the steam to escape; or the plate may be turned to bring the imperforate parts over the perforations in the top of the bell.

In the form shown in Fig. 6, the lower edge of each bell $19^a$, $20^a$, $25^a$, has a separate contact with the inclined wall $14^a$, of the base and the outer bell may be separate from the other two if desired. In this case the base is open at the bottom, so that the device may be placed directly upon a stove or other heat producer.

The device is particularly advantageous because it can be used with internal or external heating apparatus, or the heat apparatus may be dispensed with entirely, and the device used as a fireless cooker.

I am aware that various alterations and modifications of the form and construction of this device are possible without departing from the spirit of my invention, and I do not therefore desire to limit myself to the exact form of construction and arrangement shown and described.

I claim as new and desire to secure by Letters Patent:

1. In a covering for foods in process of cooking, the combination of a plurality of downwardly opening hoods spaced apart to leave an air space between the hoods, said air space being open at the bottom, and a base for the support of foods, having a surface adapted to seat the bottom rim of each hood and close the bottom of the air space.

2. In a covering for foods in process of cooking, the combination of a plurality of downwardly opening hoods spaced apart to leave an air space between the hoods, said air space being open at the bottom, a base for the support of foods, having a surface adapted to seat the bottom rim of each hood and close the bottom of the air space and means whereby the hoods may be lowered in unison.

3. In a covering for foods in process of cooking, the combination of a plurality of downwardly opening hoods, spaced apart to leave an air space between the hoods, said air space being open at the bottom, a base for the support of foods, having a surface inclined upward and inward and adapted to seat the bottom rim of each hood upon the inclined surface and close the bottom of the air space and means whereby the hoods may be lowered in unison.

4. In a covering for foods in process of cooking, the combination of a plurality of downwardly opening hoods spaced apart to leave an air space between the hoods, said air space being open at the bottom, and means whereby the hoods may be lowered in unison and each hood rest upon its bottom rim.

5. In a covering for foods in process of cooking, the combination of a plurality of downwardly opening hoods spaced apart to leave an air space between the hoods, said air space being open at the bottom, means whereby the hoods may be lowered in unison and each hood rest upon its bottom rim and a base adapted to seat the bottom rim of each hood.

6. In a covering for foods in process of cooking, the combination of a plurality of downwardly opening hoods spaced apart to leave an air space between the hoods, said air space being open at the bottom, means whereby the hoods may be lowered in unison with a little vertical play and each hood rest upon its bottom rim, and a base adapted to seat the bottom rim of each hood.

7. In a covering for foods in process of cooking, the combination of a plurality of downwardly opening hoods spaced apart to leave an air space between the hoods, said air space being open at the bottom, means whereby the hoods may be lowered in unison with a little vertical play and each hood rest upon its bottom rim, and a base having a surface inclined upward and inward and adapted to seat the bottom rim of each hood upon the inclined surface.

8. In a covering for foods in process of cooking, the combination of a plurality of downwardly opening hoods spaced apart to leave an air space between the hoods, said air space being open at the bottom, means whereby the hoods may be lowered in unison with a little vertical play and each hood rest upon its bottom rim, a base having a surface inclined upward and inward and adapted to seat the bottom rim of each hood upon the inclined surface, and a gutter around the base and exterior to the wall of the outer hood.

9. In a covering for foods in process of cooking, the combination of a plurality of downwardly opening hoods spaced apart to leave an air space between the hoods, said air space being open at the bottom, the inner hood having perforations in its upper part opening into the air space, a base adapted to seat the bottom rim of each hood, and means whereby the hoods may be lowered in unison.

10. In a covering for foods in process of cooking, the combination of a plurality of downwardly opening hoods spaced apart to leave an air space between the hoods, said air space being open at the bottom, the inner hood having perforations in its upper part opening into the air space, means whereby the perforations may be closed adjustably, a base adapted to seat the bottom rim of each hood, and means whereby the hoods may be lowered in unison.

11. In a covering for foods in process of cooking, the combination of a plurality of downwardly opening hoods spaced apart to leave an air space between the hoods, said air space being open at the bottom, the inner hood having perforations in its upper part opening into the air space, a base adapted to seat the bottom rim of each hood upon an inclined surface, and means whereby the hoods may be lowered in unison.

12. In a covering for foods in process of cooking, the combination of a plurality of downwardly opening hoods spaced apart to leave an air space between the hoods, the inner hood having perforations in its upper part opening into the air space, a base adapted to seat the bottom rim of each hood upon an inclined surface, a gutter around the base exterior to the wall of the outer hood, and means whereby the hoods may be lowered in unison.

13. In a covering for foods in process of cooking, the combination of a plurality of downwardly opening hoods spaced apart to leave an air space between the hoods, said air space being open at the bottom, the inner hood having perforations in its upper part opening into the air space, a base adapted to seat the bottom rim of each hood and means whereby the hoods may be lowered in unison with a little vertical play and each hood rest upon its bottom rim.

14. In a covering for foods in process of cooking, the combination of a plurality of downwardly opening hoods spaced apart to leave an air space between the hoods, said air space being open at the bottom, the inner hood having perforations in its upper part opening into the air space, a base adapted to seat the bottom rim of each hood upon an inclined surface, and means whereby the hoods may be lowered in unison with a little vertical play and each hood rest upon its bottom rim.

15. In a covering for foods in process of cooking, a removable downwardly opening hood forming an air space inclosing the foods, said hood having perforations in its upper part, a support for the foods and hood extending to the outer wall of the inclosed space, and means at the bottom of the inclosed space for the escape of steam and condensation, exterior to the hood inclosing the foods.

16. In a device of the class described, the combination with a base having an inclined annular side wall, of a heat retaining jacket resting upon said inclined wall, and comprising two suitably spaced, downwardly opening bells, the inner bell being provided with perforations and a movable cover for said perforations having perforations adapted to register with the perforations in the bell.

17. In a device of the class described, the combination with a base, an open bottomed cover, comprising an outer bell supported upon the base, and an inner bell carried by the outer bell, and having a limited amount of play with respect thereto, whereby its lower edge may seat itself upon the base whenever the cover is placed thereon.

18. In a device of the class described, the combination with a base having an inclined wall, an open bottomed cover, comprising an outer bell supported upon the inclined wall of the base, and an inner bell carried by the outer bell, and having a limited amount of play with respect thereto, whereby its lower edge may seat itself upon the inclined wall of the base whenever the cover is placed thereon.

19. In a device of the class described, the combination with a base having sockets secured thereto, and a heat retaining jacket carried by said base, of a rack removably seated in said sockets and comprising upper and lower horizontal intersecting members and end members joining said horizontal members at three sides, but leaving one open side through which material may be introduced upon said racks.

20. In a device of the class described, the combination with a base and a heat retaining jacket supported thereby, of a rack adapted to be removably supported by said base and comprising a main section having upper and lower horizontal members, and an auxiliary section adapted to be removably secured to said main section, to provide an intermediate horizontal member therein.

In witness whereof, I have hereunto subscribed my name at Chicago, Cook county, Illinois, this 14th day of July 1911.

HERMAN B. SEELY.

Witnesses:
FANNIE F. RICHARDS,
CHARLES O. SHERVEY.